US011948090B2

(12) United States Patent
Jiang et al.

(10) Patent No.: US 11,948,090 B2
(45) Date of Patent: Apr. 2, 2024

(54) METHOD AND APPARATUS FOR VIDEO CODING

(71) Applicant: Tencent America LLC, Palo Alto, CA (US)

(72) Inventors: Wei Jiang, San Jose, CA (US); Wei Wang, Palo Alto, CA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 812 days.

(21) Appl. No.: 17/096,126

(22) Filed: Nov. 12, 2020

(65) Prior Publication Data
US 2021/0279594 A1 Sep. 9, 2021

Related U.S. Application Data

(60) Provisional application No. 62/986,330, filed on Mar. 6, 2020.

(51) Int. Cl.
*G06N 3/084* (2023.01)
*G06F 17/18* (2006.01)
(Continued)

(52) U.S. Cl.
CPC ............ *G06N 3/084* (2013.01); *G06F 17/18* (2013.01); *G06F 18/213* (2023.01); *G06F 18/2163* (2023.01); *G06T 9/002* (2013.01)

(58) Field of Classification Search
CPC .......... G06N 3/084; G06N 3/04; G06N 3/045; G06N 3/082; G06N 3/048; G06F 17/18;
(Continued)

(56) References Cited

U.S. PATENT DOCUMENTS 10,771,807 B1 * 9/2020 Ulaganathan ........... G06F 17/15
11,379,473 B1 * 7/2022 Paiz ..................... G06F 16/243
(Continued)

FOREIGN PATENT DOCUMENTS

CN      109492547 A  *  3/2019  ......... G06K 9/00201
CN      109996071 A  *  7/2019
(Continued)

OTHER PUBLICATIONS

Song Han, et al; "Learning both Weights and Connections for Efficient Neural Networks", Year 2015, 9 pages.

Primary Examiner — Steven P Sax
(74) Attorney, Agent, or Firm — ARENTFOX SCHIFF LLP

(57) ABSTRACT

In the present disclosure, a method for compressing a feature map is provided, where the feature map is generated by passing a first input through a deep neural network (DNN). A respective optimal index order and a respective optimal unifying method are determined for each of super-blocks that are partitioned from the feature map. A selective structured unification (SSU) layer is subsequently determined based on the respective optimal index order and the respective optimal unifying method for each of the super-blocks. The SSU layer is added to the DNN to form an updated DNN, and is configured to perform unification operations on the feature map. Further, a first estimated output is determined, where the first estimated output is generated by passing the first input through the updated DNN.

14 Claims, 6 Drawing Sheets

(51) Int. Cl.
*G06F 18/21* (2023.01)
*G06F 18/213* (2023.01)
*G06T 9/00* (2006.01)

(58) Field of Classification Search
CPC .. G06F 18/213; G06F 18/2163; G06F 18/214;
G06F 18/241; G06T 9/002; G06T 5/20;
G06T 5/80; G06T 3/4007; H04N 19/61;
H04N 19/119; H04N 19/33; H04N
19/186; H04N 19/50; H04N 21/44008;
G16B 20/00; G16B 50/00; G16B 50/50;
G16B 20/40; G06V 10/26; G06V 10/40;
H03M 7/3082
See application file for complete search history.

(56) References Cited

U.S. PATENT DOCUMENTS

| | | | | |
|---|---|---|---|---|
| 11,496,151 B1 * | 11/2022 | Wang | .................. | H03M 7/3064 |
| 11,861,886 B2 * | 1/2024 | Wang | .................... | G10L 15/26 |
| 11,871,043 B2 * | 1/2024 | Wang | .................... | H04N 19/13 |
| 2019/0333190 A1 * | 10/2019 | Schroers | .................. | G06T 5/20 |
| 2020/0092552 A1 * | 3/2020 | Coelho | ................ | H04N 19/147 |
| 2020/0092556 A1 * | 3/2020 | Coelho | ................ | H04N 19/176 |
| 2020/0186809 A1 * | 6/2020 | Mukherjee | ........... | H04N 19/176 |
| 2020/0280717 A1 * | 9/2020 | Li | ............................ | G06N 3/08 |
| 2020/0389645 A1 * | 12/2020 | Alakuijala | ........... | H04N 19/192 |
| 2021/0166343 A1 * | 6/2021 | Kim | ....................... | G06N 3/045 |
| 2021/0326710 A1 * | 10/2021 | Wang | ...................... | G06N 3/084 |
| 2022/0201316 A1 * | 6/2022 | Coelho | .................... | G06N 3/045 |
| 2023/0007284 A1 * | 1/2023 | Li | ........................ | H04N 19/593 |
| 2023/0096567 A1 * | 3/2023 | Nalci | ................... | H04N 19/147 |
| | | | | 375/240.03 |
| 2023/0122449 A1 * | 4/2023 | Jiang | ...................... | H04N 19/42 |
| | | | | 382/157 |
| 2023/0217028 A1 * | 7/2023 | Zhang | ..................... | H04N 19/30 |
| | | | | 375/240.02 |
| 2023/0269387 A1 * | 8/2023 | Cricrì | ................... | G06N 3/0455 |
| | | | | 375/240.03 |

FOREIGN PATENT DOCUMENTS

| | | | | | |
|---|---|---|---|---|---|
| CN | 110121747 | A | * | 8/2019 | ............. G16B 20/00 |
| CN | 110288518 | A | * | 9/2019 | |
| CN | 110519595 | A | * | 11/2019 | |
| CN | 110958467 | A | * | 4/2020 | |
| CN | 110225341 | B | * | 8/2020 | ........... G06N 3/0454 |
| CN | 113168891 | A | * | 7/2021 | ............. B33Y 50/00 |
| CN | 107944555 | B | * | 9/2021 | .......... G06K 9/6223 |
| CN | 111160354 | B | * | 6/2022 | ................ G06K 9/34 |
| EP | 3829173 | A1 | * | 6/2021 | .......... G06N 3/0445 |
| JP | 2017122713 | A | * | 7/2017 | |
| JP | 7168896 | B2 | * | 11/2022 | .......... H04N 19/136 |

* cited by examiner

FIG. 3A FIG. 3B FIG. 3C FIG. 3D
FIG. 3E FIG. 3F FIG. 3G FIG. 3H
FIG. 3I FIG. 3J FIG. 3K FIG. 3L
FIG. 3M FIG. 3N FIG. 3O

METHOD AND APPARATUS FOR VIDEO CODING

INCORPORATION BY REFERENCE

This present disclosure claims the benefit of priority to U.S. Provisional Application No. 62/986,330, "FEATURE MAP COMPRESSION WITH STRUCTURED UNIFICATION" filed on Mar. 6, 2020, which is incorporated by reference herein in its entirety.

TECHNICAL FIELD

The present disclosure describes embodiments generally related to neural network model compression.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

ISO/IEC MPEG (JTC 1/SC 29/WG 11) has been actively searching for potential needs for standardization of future video coding technology for visual analysis and understanding. The Compact Descriptors for Visual Search (CDVS) standard was adopted by ISO in 2015 as a still-image standard, which extracts feature representations for image similarity matching. The Compact Descriptors for Visual Analysis (CDVS) standard is listed as Part 15 of MPEG 7 and ISO/IEC 15938-15 and was finalized in 2018, which extracts global and local, hand-designed and Deep Neural Network (DNN)-based, feature descriptors for video segments. The success of DNN in a large range of video applications such as semantic classification, target detection/recognition, target tracking, video quality enhancement, etc. poses a strong need for compressing the DNN models. MPEG is also working on the Coded Representation of Neural Network standard (NNR), which encodes DNN models to save both storage and computation.

In July 2019, a group was formed for the Video Coding for Machine (VCM) standard to explore the topic of "compression coding for machine vision as well as compression for human-machine hybrid system," targeting at developing a standard that can be implemented in chips for broad use with any video-related Internet of Things (IoT) devices. Compared with the previous CDVA and CDVS, VCM is an emerging video for machine standard that can be viewed as a superset of CDVA. Through combining multiple feature maps of a neural network backbone, VCM can handle more advanced visual analysis tasks such as semantic segmentation and video restoration.

In the present disclosure, an iterative network retraining/refining framework is used to jointly optimize the original training target and the feature unification loss comprising a compression rate loss, a unification distortion loss, and a computation speed loss, so that the learned DNN preserves the original target performance, and can generate feature maps that are both compression friendly (that can be further compressed effectively for efficient storage and transmission) and computation friendly (that can speed up computation of using the generated feature maps).

SUMMARY

This disclosure includes a method of compressing a feature map generated by a DNN, for example by using a unification regularization in an iterative network retraining/fine tuning framework. A feature unification loss can include a compression rate loss, a unification distortion loss, and a computation speed loss. The feature unification loss can be jointly optimized with the original network training target through the iterative retraining/fine tuning process.

According to an aspect of the disclosure, methods and apparatuses for compressing a feature map are provided, where the feature map is generated by passing a first input through a DNN. A respective optimal index order and a respective optimal unifying method can be determined for each of super-blocks that are partitioned from the feature map. A selective structured unification (SSU) layer can be subsequently determined based on the respective optimal index order and the respective optimal unifying method for each of the super-blocks. The SSU layer can be added to the DNN to form an updated DNN, and be configured to perform unification operations on the feature map. Further, a first estimated output can be determined, where the first estimated output is generated by passing the first input through the updated DNN.

In some embodiments, network coefficients of the DNN can further be updated based on a first expected output and the first estimated output.

In order to determine the respective optimal index order and the respective optimal unifying method for each of the super-blocks, unifying methods can be defined for each of the super-blocks. Feature unification losses can be obtained based on the unifying methods for each of the super-blocks. The respective optimal index order and the respective optimal unifying method can thus be determined for each of the super-blocks based on the feature unification losses, where the respective optimal index order, and the respective optimal unifying method for the respective super-block correspond to a minimum feature unification loss of the feature unification losses.

In some embodiments, to obtain the feature unification losses, a first feature unification loss of the feature unification losses can be obtained for a first super-block. The first feature unification loss can be equal to a sum of a compression rate loss, a unification distortion loss, and a computation speed loss.

In order to obtain the first feature unification loss, the first super-block can be partitioned into blocks, where each of the blocks can have a respective sub compression rate loss, a respective sub unification distortion loss, and a respective sub computation speed loss. Further, the compression rate loss of the first super-block can be obtained, where the compression rate loss of the first super-block can be equal to a sum of the sub compression rate losses of the blocks. The unification distortion loss of the first super-block can be obtained, where the unification distortion loss of the first super-block can be a sum of the sub unification distortion losses of the blocks. The computation speed loss of the first super-block can be obtained, where the computation speed loss of the first super-block can be a sum of the sub computation speed losses of the blocks.

In some embodiments, each of the sub compression rate losses can be equal to a standard deviation of absolute values of features in a corresponding block. Each of the sub unification distortion losses can be equal to a reciprocal of a multiplication value of a height, a width, and a depth for a corresponding block. Each of the sub computation speed losses can be a function of a number of multiplication operations in a computation using a unifying method for a corresponding block.

In the method, the SSU layer can be added after an extraction layer of the DNN that generates the feature map.

In some embodiments, in order to update the network coefficients of the DNN, the feature map can be generated by passing the first input through the updated DNN, where the feature map is generated by the extraction layer. A unified feature map can be subsequently generated by passing the feature map through the SSU layer that is positioned after the extraction layer. The unified feature map can be further passed through remaining layers of the updated DNN to generate the first estimated output.

In order to generate the unified feature map, the super-blocks of the feature map can be ranked according to feature unification losses of the super-blocks in an ascending order, where each of the super-blocks can be reordered along a depth of the feature map according to a corresponding index order. A unification ratio q can be defined. Further, a q percent of the super-blocks that is ranked in the ascending order can be unified through an index order and a unifying method, where the index order and the unifying method generate a minimum feature unification loss in the feature unification losses of the super-blocks.

In order to update the network coefficients of the DNN based on the first input and the first estimated output, a target loss can be defined according to the first estimated output and the first expected output. A gradient of the target loss can further be obtained. The network coefficients of the DNN can subsequently be updated based on the gradient of the target loss through a back propagation and weight update process.

In some embodiments, a second estimated output can be determined. The second estimated output can be generated by passing a second input through the updated DNN. The network coefficients of the DNN can further be updated based on a second expected output and the second estimated output.

In some examples, the apparatus for compressing the feature map includes receiving circuitry and processing circuitry that is configured to perform one or more of the methods described above.

Aspects of the disclosure also provide a non-transitory computer-readable medium storing instructions which when executed by a computer for parallel processing of a data stream cause the computer to perform one or more of the methods described above.

BRIEF DESCRIPTION OF THE DRAWINGS

Further features, the nature, and various advantages of the disclosed subject matter will be more apparent from the following detailed description and the accompanying drawings in which:

FIGS. 3A-3O are exemplary unifying methods to unify weights in 4×4 blocks according to some embodiments of the disclosure.

DETAILED DESCRIPTION OF EMBODIMENTS

Aspects of the disclosure include various techniques for neural network model compression. For example, a feature map generated by a DNN can be compressed by using a unification regularization in an iterative network retraining/fine tuning framework.

Artificial neural networks can be adopted for a broad range of tasks in multimedia analysis and processing, media coding, data analytics, and many other fields. Success of using artificial neural networks is based on the feasibility of processing much larger and complex neural networks (deep neural networks, DNNs) than in the past, and the availability of large-scale training data sets. As a consequence, trained neural networks can contain a large number of parameters and weights, resulting in a quite large size (e.g., several hundred MBs). Many applications require the deployment of a particular trained network instance, potentially to a larger number of devices, which may have limitations in terms of processing power and memory (e.g., mobile devices or smart cameras), and also in terms of communication bandwidth.

Figure 1:
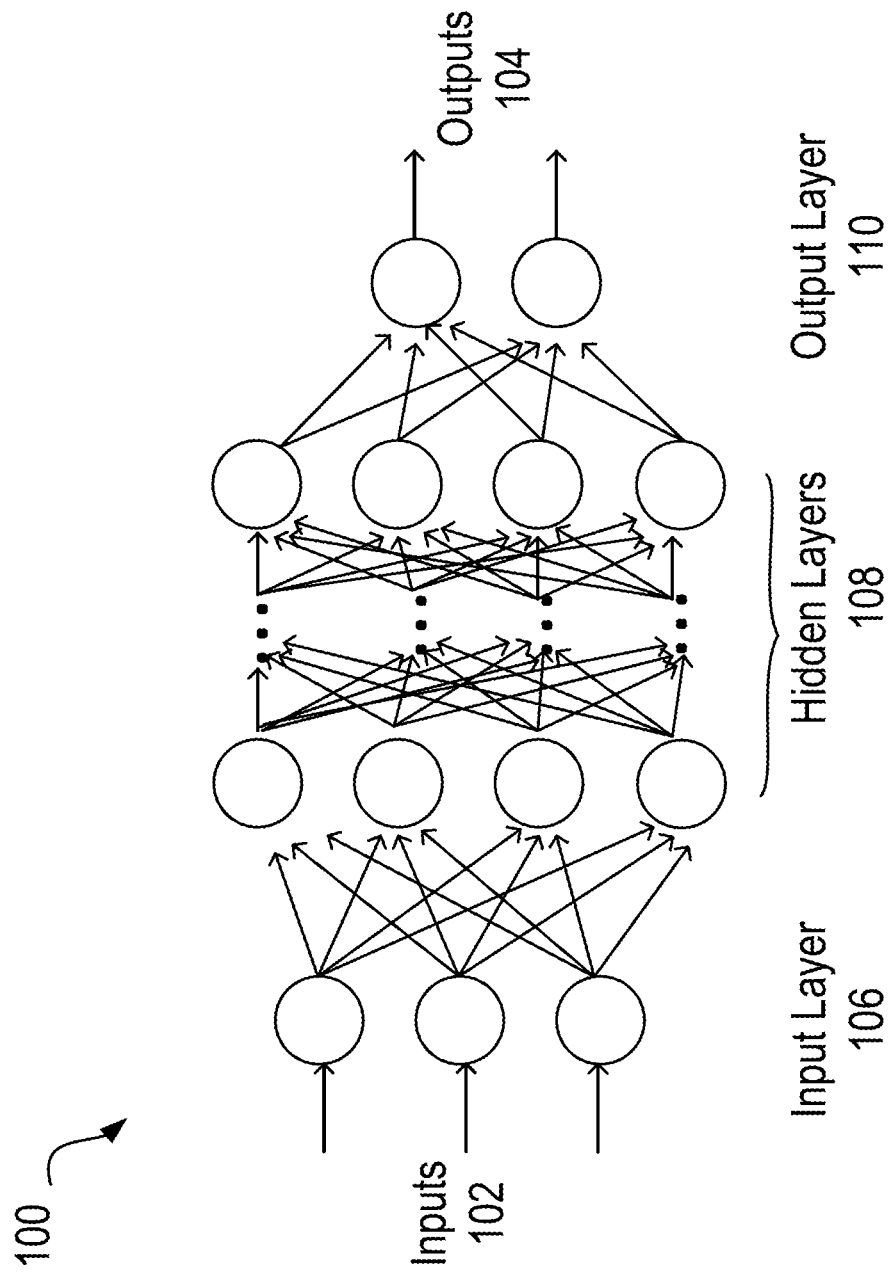
FIG. 1 is a schematic diagram of a deep learning model according to some embodiments of the disclosure.

A DNN can combine multiple nonlinear processing layers, using simple elements operating in parallel and inspired by biological nervous systems. It can consist of an input layer, several hidden layers, and an output layer. The layers are interconnected via nodes, or neurons, with each hidden layer using the output of the previous layer as its input. FIG. 1 is a schematic view of a DNN (100) that can include one or more inputs (102), an input layer (106), a plurality of hidden layers (108), an output layer (110), and one or more outputs (104). As shown in FIG. 1, the one or more inputs (102) can pass through the input layer 106, the hidden layers (108), the output layer (110), where each of the layers (106, 108, 110) is a mathematical manipulation, and the DNN (100) can find correct mathematical manipulations to turn the one or more inputs (102) into the one or more outputs (104). The mathematical manipulations can include a linear relationship or a non-linear relationship. The DNN (100) moves through the layers (106, 108, 110) by calculating the probability of an output of each layer of the layers (106, 108, 11).

Figure 2:
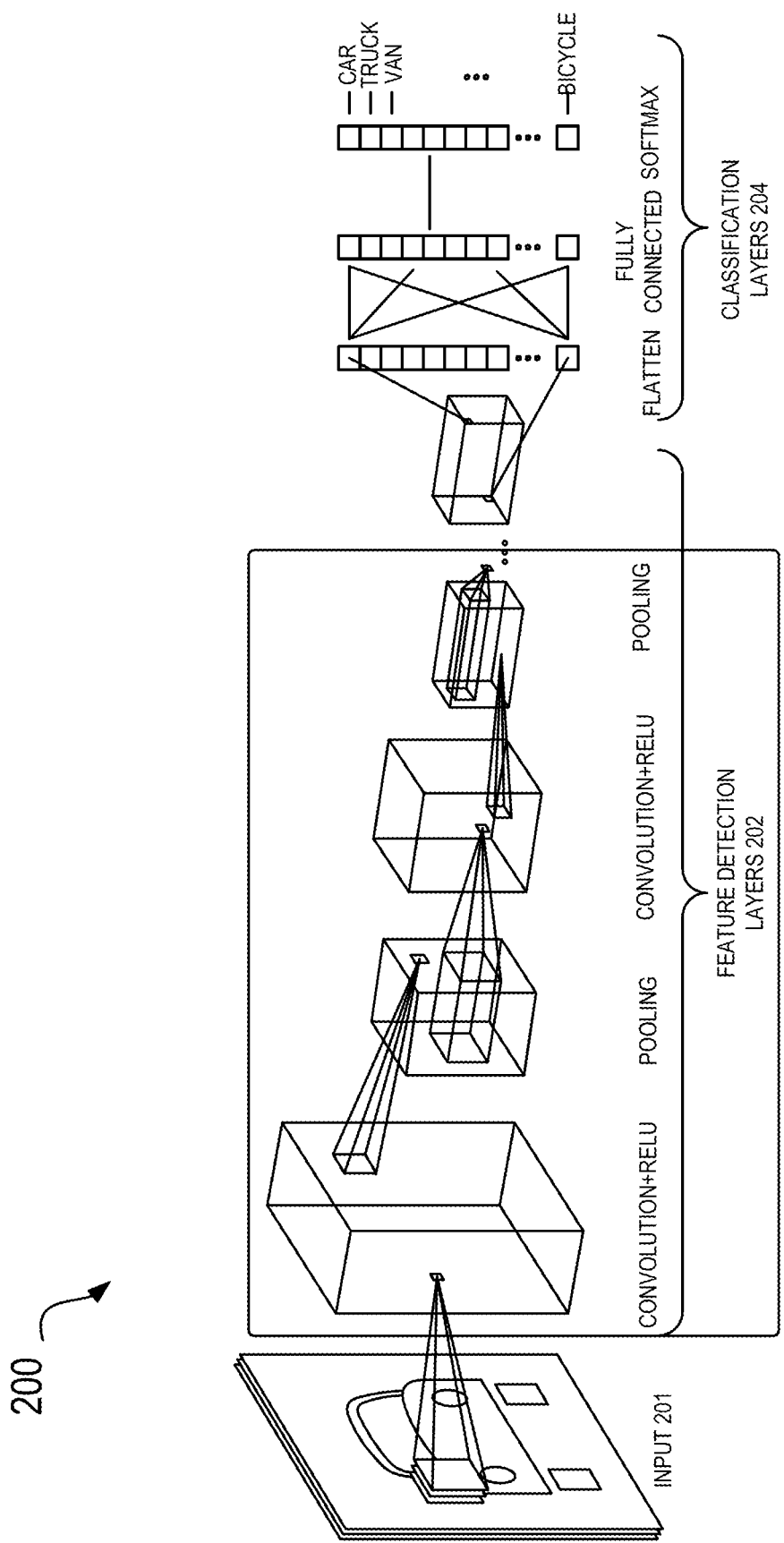
FIG. 2 is a schematic diagram of a DNN model according to some embodiments of the disclosure.

FIG. 2 is a schematic diagram of a DNN model (200) that applies convolution operations to turn an input into an output. The DNN can be composed of an input layer, an output layer, and many hidden layers in between. In another way, the DNN can include feature detection layers and classification layers. As shown in FIG. 2, the DNN (200) can include feature detection layers (202) and classification layers (204). The feature detection layers (202) can perform operations on the data, such as convolution, pooling, or rectified linear unit (ReLU). The convolution operation (or convolution layer) puts input images (or input) (201) through a set of convolutional filters, each of the convolutional filters can activate certain features from the input images (201). The convolutional layers are major building blocks used in DNN and mainly used for convolution operation. In order to perform a convolution operation, a filter (or kernel) is required to be defined. The filter can normally be a matrix. The convolution operation is that each pixel corresponding to a local area of an image covered by the filter is multiplied first and then accumulated. Repeated application of the same filter to an input can result in a map of activations called a feature map, indicating the locations and strength of a detected feature in an input, such as an image.

The pooling operation (or pooling layer) simplifies the output by performing nonlinear downsampling, and reducing the number of parameters that the DNN network (or DNN) (200) needs to learn about. The rectified linear unit (ReLU) operation (or ReLU layer) allows for faster and more effective training by mapping negative values to zero and maintaining positive values. These three operations are repeated over the feature detection layers (202), where the feature detection layers (202) can include tens or hundreds of layers, with each layer learning to detect different features. After feature detection (or feature detection layers (202)), the architecture of the DNN (200) shifts to classification (or classification layers (204)). The classification layers (204) can perform operations on the data, such as flatten, fully connected, and softmax. As shown in FIG. 2, the flatten operation (or flatten layer) is configured to change the shape of the data from a vector of two-dimensional matrixes (or three-dimensional matrices) into the correct format for the fully connected layers to interpret. The fully connected layer (FC) (or FC operation) is configured to output a vector of K dimensions, where K is the number of classes that the DNN network (200) can predict. In some embodiments, the fully connected layer can function as an output layer of the DNN (200). The vector of K dimension can contain the probabilities for each class of any image being classified. The softmax layer (or softmax operation) of the DNN network (200) is configured to apply a softmax function to provide the classification output.

In a DNN (e.g., DNN 200), a data set can be denoted as $\mathcal{D}=\{(x, F, \Theta)\}$, where an input x is passed through the DNN (represented by its weight coefficients $\Theta$) to generate a feature map F. The DNN can be a subnetwork of another DNN with weight coefficients $\Theta_O$ which is trained for some task using a dataset $\mathcal{D}_O=\{(x_O, y_O)\}$, where each input $x_O$ is associated with an annotation $y_O$. For example, for a task of semantic segmentation, each input $x_O$ can be a color image and $y_O$ can be a segmentation map of the same resolution as $x_O$. In addition, each item in the segmentation map can be an index of the semantic category which the corresponding pixel in $x_O$ is assigned to. For a task of super-resolution, $x_O$ can be a low-resolution image generated from the ground-truth high-resolution image $y_O$. The DNN $\Theta$ can be the first few layers of the bigger DNN $\Theta_0$ and is often called the backbone (or feature extraction) network of DNN $\Theta_O$. The data set D can be the same as $\mathcal{D}_O$. It can also be a different data set from $\mathcal{D}_O$, but with similar data distribution as $\mathcal{D}_O$. For example, x and $x_O$ can have a same dimension, and a same probability distribution $p(x,y)=p(x_O, y_O)$, where y is the underlying annotation associated with x.

The feature map F can be a general 4D tensor of size (h, w, c, t). In the 4D tensor size, h and w can be the height and width of the feature map F. For example, for the semantic segmentation or super-resolution task, h and w can be the same as an original height and width of the input image (or input) x, which determines the resolution of the feature map F. Moreover, t can be a length of the feature map. For example, for video classification, t can be the length of the video segment. When t=1, the feature map reduces to a 3D tensor. Further, c can be a depth of the feature map F, corresponding to c channels in general. Due to the nature of the DNN computation, the feature map F can have a smooth property in that neighboring features in the feature map F tend to have similar values in the (h,w) facet. This is because of the smooth nature of the original input image x and the smoothness-preserving convolution operation of the DNN computation. From the perspective of feature extraction, features along different channels extract different aspects of information to represent the input x, and the feature map F can have low responses (low feature values) in insignificant regions. For example, for the task of semantic segmentation, a feature map of one channel may have a high response over objects of a semantic category (e.g., a car), and have a low response over all other regions. A feature map of another channel may have a high response over objects of another semantic category (e.g., buildings), and have low responses over all other regions. Therefore, the feature map can be quite sparse, and for most parts of the sparse feature map, it is also reasonable to pursue local smoothness along the channel dimension since the insignificant small responses can be set to be the same without significantly affecting the overall prediction.

In the disclosure, a Selective Structured Unification (SSU) layer is provided. In some embodiments, the SSU layer can be arranged in the feature detection layers (202) that are illustrated for example in FIG. 2. The SSU layer can make use of the smoothness property mentioned above, which selectively unifies some features in the feature map F according to some desired unifying structure to facilitate the encoding of the feature map F (i.e., quantization and entropy coding) for storage reduction and to speed up inference for computation reduction, while maintaining the original prediction target performance of the DNN. As for the t dimension, whether to pursue the smoothness property depends on the DNN itself. For example, if t corresponds to t consecutive frames in a video segment, it is reasonable to also pursue smoothness along the t axis.

In the DNN, $\Theta=\{W\}$ can denote a set of weight coefficients of the DNN which generates the feature map F for a given input x. The DNN can be part of a bigger DNN with weight coefficients $\Theta_O=\{W_O\}$, which are trained with a target to learn an optimal set of weight coefficients $\Theta^*_O=\{W^*_O\}$ so that a target loss $\mathcal{L}_T(\mathcal{D}|\Theta_O)$ can be minimized. Typically, the target loss $\mathcal{L}_T(\mathcal{D}|\Theta_O)$ can have two parts: an empirical data loss $\mathcal{L}_D(\Theta_O)$, such as the cross-entropy loss for classification tasks, and a regularization loss $\mathcal{L}_D(\mathcal{D}_0)$, such as the sparsity-promoting regularization. The target loss $\mathcal{L}_T(\mathcal{D}|\Theta_O)$ can be described in Equation (1):

$$\mathcal{L}_T(\mathcal{D}|\Theta)= \mathcal{L}_D(\mathcal{D}|\Theta_O)+\lambda_R \mathcal{L}_R(\Theta_O) \qquad \text{Eq. (1)}$$

where $\lambda_R \geq 0$ is a hyperparameter balancing the contributions of the empirical data loss and the regularization loss.

In the disclosure, a feature unification loss $\mathcal{L}_U(\Theta)$ can further be provided, which can be optimized together with the original target loss $\mathcal{L}_1(\mathcal{D}|\Theta_O)$. Thus, a joint loss $\mathcal{L}(\mathcal{D}|\Theta_O)$ can be described in Equation (2):

$$\mathcal{L}(\mathcal{D}|\Theta_O)= \mathcal{L}_1(\mathcal{D}|\Theta_O)+\lambda_U \mathcal{L}_U(\Theta) \qquad \text{Eq. (2)}$$

where $\lambda_U \geq 0$ is a hyperparameter to balance the contributions of the original prediction target $\mathcal{L}_T(\mathcal{D}|\Theta_O)$ and the feature unification loss $\mathcal{L}(\mathcal{D}|\Theta_O)$. By optimizing the joint loss $\mathcal{L}(\mathcal{D}|_O)$ of Equation (2), the optimal DNN $\Theta^*_O$ (or DNN $\Theta^*$) can be obtained to preserve the original prediction performance and generate the feature map $F(x,\Theta^*)$ for each input x that is effective for further encoding compression. Also, the disclosed feature unification loss $\mathcal{L}_U(\Theta)$ can take into consideration how the feature map $F(x, \Theta^*)$ is used in a future convolution operation, where the convolution operation can be performed as a GEMM (i.e., general matrix multiplication) matrix multiplication process. Therefore, the feature map generated by the optimized DNN $\Theta^*$ can largely accelerate the computation of future usage of the feature map $F(x, \Theta^*)$. It should be noted that the feature unification loss $\pounds_U(\Theta)$ can be viewed as an additional regularization term to a general target loss $\pounds_T(\mathcal{D}|\Theta_O)$, with (when $\lambda_R>0$) or without (when $\lambda_R=0$) general regularizations. Also, methods of the present disclosure can be flexibly applied to any regularization loss $\pounds_R(\Theta_O)$.

In an exemplary embodiment, the feature unification loss $\pounds_U(\Theta)$ can further include a compression rate loss $\pounds_C(\Theta)$, a unification distortion loss $\pounds_f(\Theta)$, and a computation speed loss $\pounds_S(\Theta)$ as described in Equation (3):

$$\pounds_U(\Theta)=\pounds_f(\Theta)+\lambda_C\pounds_C(\Theta)+\lambda_S\pounds_S(\Theta) \qquad \text{Eq. (3)}$$

Detailed descriptions of these loss terms can be described in later sessions. For both the learning effectiveness and the learning efficiency, an iterative optimization process can further be applied. In a first step of the iterative optimization process, a way to unify the feature map in the SSU layer can be determined based on the feature unification loss $\pounds_U(\Theta)$. In a second step of the iterative optimization process, the SSU layer can be fixed with the determined feature map unifying method, and the DNN weight coefficients can be updated by back-propagating the training loss (e.g., $\pounds T(\mathcal{D}|\Theta 0)$). By iteratively conducting these two steps, the joint loss $\pounds(\mathcal{D}|\Theta_O)$ can be gradually optimized effectively, and the learned DNN can generate feature maps with desired properties.

Given the general 4D feature map tensor of size (h, w, c, t), typically the feature map can be used as the input of another set of network layers, such as a few fully connected layers, a few convolution layers followed by fully connected layers, etc. In the DNN, W can denote the weight coefficients of the layer using the feature map as input, the output of the layer O can be computed through the convolution operation, which can be implemented as the GEMM matrix multiplication process. Corresponding to the general 4D tensor feature map F, the weight coefficients W can be a general 5D tensor of size ($c, k_1, k_2, k_3, c_o$), and the output O can also be a general 4D tensor of size ($h_o, w_o, c_o, t_o$). When any of the c, $k_1$, $k_2$, $k_3$, $c_o$, h, w, t, $h_o$, $w_o$, $c_o$, and $t_o$ is 1, the corresponding tensor reduces to a lower dimension. Each item in each tensor can be a floating number. The output O can be computed through the convolution operation based on F and W in Equation (4):

$$O_{l',m',n',v} = \qquad \text{Eq. (4)}$$
$$\sum_{r=1}^{k_1}\sum_{s=1}^{k_2}\sum_{p}^{k_3}\sum_{u=1}^{c} W_{u,r,s,p,v} F_{u,l-\frac{k_1-1}{2}+r,m-\frac{k_2-1}{2}+s,n-\frac{k_3-1}{w}+p},$$
$$l = 1, \ldots, h; m = 1, \ldots, w; n = 1, \ldots t; l'1, \ldots, h_0;$$
$$m' = 1, \ldots, w_o; n' = 1, \ldots, t_0; v = 1, \ldots, c_0$$

As shown in Equation (4), the parameters $k_1$, $k_2$, and $k_3$ can be the size of the convolution kernel corresponding to the height, width and depth axes, respectively. The relation between l and l', m and m', n and n' can be determined by a hopping size along the axes. For example, when the hopping size is 1 along the height axis, l=l', and when the hopping size is 2 along the width axis, m=2m'. The order of the above summation operation can be changed, corresponding to matrix multiplication of reshaped F and reshaped W.

The feature map F can further be partitioned into 4D super-blocks of size ($h_s, w_s, c, t$), $1 \leq h_s \leq h$, $1 \leq w_s \leq w$. In an exemplary embodiment, a 3-Dimensional Coding Tree Unit (CTU3D) structure can be adopted as super-blocks. Thus, the feature map F can be treated as a number of t 3D tensors of size (h,w,c). Each 3D tensor can further be partitioned into 3D units of size ($h_s$, $w_s$, c). Let S denotes a super-block, an order index I(S) can be determined for S to reorder the c channels along the depth axis to generate a reordered super-block. Then the reordered super-block can further be partitioned into blocks of size ($h_b, w_b, c_b$), $1 \leq h_b \leq h_s$, $1 \leq w_b \leq w_s$, $1 \leq c_b \leq c$. Let B denote a block, a unifier can be applied to unify features within the block B. A plurality of ways can be applied to unify features. For example, in an embodiment, features of the block B can be set to a same value so that the whole block B can be efficiently represented in the following encoding process. In another embodiment, the features of the block B can be set to share a same absolute value, while keeping original signs of the features.

FIGS. 3A-3O are exemplary unifying methods U(S) to unify weights (or features) in 4×4 blocks according to some embodiments of the disclosure. As shown in FIGS. 3A-3O, 15 exemplary unifying methods can be applied to unify the features of the 4×4 blocks. The features of the blocks can be set to values that are represented by a, b, c, and d. Given a unifying method U(S), a unification distortion loss $\pounds_f(B,U(S))$ can be computed to measure the error introduced by unifying features of the block B using the unifying method U(S).

For example, features of the block B can be set to have a same absolute value while keeping original signs of the features. The same absolute value V(B) can be a mean of the absolute values (abs(v)) of all features in the block B, which can be provided as $V(B)=\text{mean}_{v \in B}(\text{abs}(v))$. In such a case, a standard deviation of the absolute values abs (v) of all features of the block B can be applied to define the unification distortion loss as $\pounds_f(B,U(S))=\text{std}_{v \in B}(\text{abs}(v))$. Given an order index I(S) and a unifying method U(S), the unification distortion loss of the super-block S can be computed as Equation (5):

$$\pounds_f(I(S),U(S))=\Sigma_{B \in S}\pounds_f(B,U(S)) \qquad \text{Eq. (5)}$$

A compression rate loss $\pounds_C(B,U(S))$ of the block B can be computed to measure the compression efficiency of unifying features in block B according to the unifying method U(S). For example, when all features of the block B are set to be a same value, only one number can be applied to represent the whole block B, and the compression rate can be defined as $r_{compression}=h_b \cdot w_b \cdot c_b$. Accordingly, $\pounds_C(B,U(S))$ can then be defined as $1/r_{compression}$, and $\pounds_C(I(S),U(S))$ can be computed as Equation (6):

$$\pounds_C(I(S),U(S))=\Sigma_{B \in S}\pounds_C(B,U(S)) \qquad \text{Eq. (6)}$$

A speed loss $\pounds_S(B,U(S))$ of the block B can be computed to measure the estimated inference computation speed of using the unified features that are unified according to the unifying method U(S), which can be a function of the number of multiplication operations in the DNN computation by using the unified features that are unified according to the unifying method U(S). For example, when all features of the block B are set to be the same value, one or more multiplication operations can be omitted to obtain the matrix multiplication output of using the block B by sharing the intermediate outputs. The speed loss of the entire super-block S can be given by Equation (7):

$$\pounds_S(I(S),U(S))=\Sigma_{B \in S}\pounds_S(B,U(S)) \qquad \text{Eq. (7)}$$

Based on Equations (5), (6), (7), for each super-block S of the feature map F, the unification loss $\pounds_U(I(S),U(S))$ provided in Equation (3) can be obtained for a corresponding unifying method U(S). When one or more unifying methods (e.g., unifying methods in FIGS. 3A-3O) are applied, one or more unification losses can be obtained correspondingly according to Equation (3). An optimal index order I*(S) and an optimal unifying method U*(S) can be determined based on the one or more unification losses. The optimal index order I*(S) and the optimal unifying method U*(S) can correspond to a minimum feature unification loss of the one or more feature unification losses, and give the optimal unification loss $£*_U(I*(S), U*(S))$.

Figure 4:
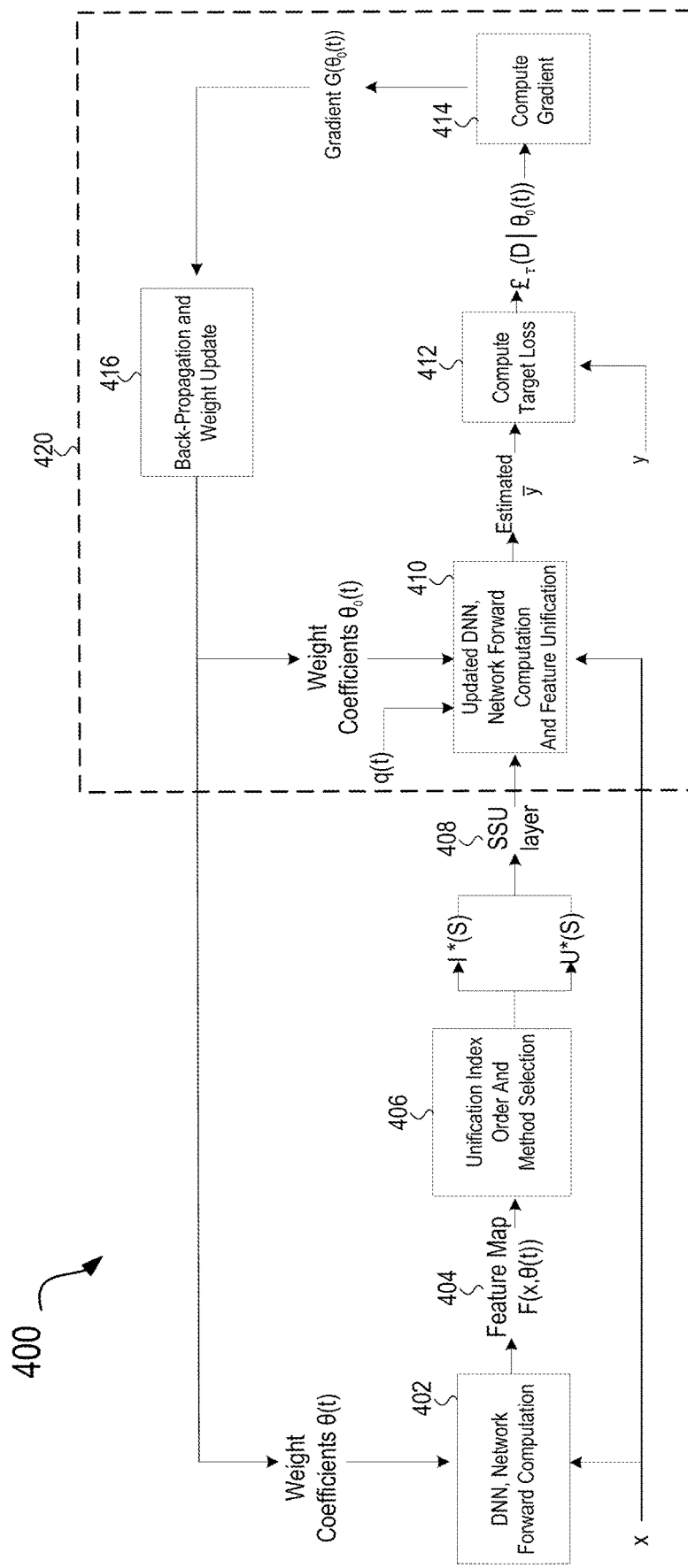
FIG. 4 is an exemplary overall workflow of compressing a feature map generated by a DNN according to some embodiments of the disclosure.

FIG. 4 shows an overall framework of an iterative retraining/fine tuning process, which iteratively alternates two processing steps to optimize the joint loss $£(\mathcal{D}|\Theta_O)$ of Equation (2) gradually. As shown in FIG. 4, a DNN model (normally pre-trained) (402) with weight coefficients $\Theta=\{W\}$ can be provided, which can be a part of a bigger DNN with weight coefficients $\Theta_O=(W_O)$. $\Theta=\{W\}$ can correspond to the feature extraction part (e.g., (202) in FIG. 2) of the bigger DNN. In the first processing step, the optimal index order I*(S) as well as the optimal unifying method U*(S) can be defined to unify features for each of the set of partitioned super-blocks {S} of the feature map generated by the DNN (402) with weight coefficients $\Theta$, through a Unification Index Order and Method Selection process (406). The size of the super-blocks can be determined based on compression methods. In an exemplary embodiment, the CTU3D structure can be applied as the super-blocks, and a number of t 3D feature map tensors can be processed individually. Specifically, each CTU3D unit (or structure) S can have a size (64,64,c), which can further be partitioned into blocks, and each block B can have a size $(2,2,c_b)$, where $c_b \leq 2$, depending on the shape of the feature map F. For example, if the feature map has only one channel (c=1), $c_b=1$.

To determine the optimal index order I*(S) and the optimal unifying method U*(S) for each super block S, a training data set $\mathcal{D}=\{(x, F, \Theta)\}$ can be applied in the Unification Index Order and Method Selection module (406). For the t-th iteration, current weights $\Theta(t-1)$ can be defined as $\Theta(t-1)=\{W(t-1)\}$. Each input data (or input) x can thus be passed through the DNN $\Theta(t-1)$ via a Network Forward Computation process (402) to generate a feature map $F(x, \Theta(t-1))$ (404). As described in the above section, the Unification Index Order and Method Selection module (or process) (406) can compute the unification loss $£_U(x,\Theta(t-1),I(S),U(S))$ described in Equation (3). The unification losses of different inputs can be accumulated to determine the optimal order of indices (or optimal index order) I*(S) and the optimal unifying method U*(S), where the optimal order of indices (or optimal index order) I*(S) and the optimal unifying method U*(S) correspond to a minimum unification loss. Different configurations can be applied to define the optimal index order and optimal unifying method for feature maps of all inputs. For example, all feature maps of all inputs can be set to share the same optimal unifying method U*(S), or to share the same optimal unifying method U*(S) and the same optimal index order I*(S), or to have an individual index order and unifying method, etc. In an exemplary embodiment, all feature maps of all inputs can be set to share the same unifying method U*(S), but keep the corresponding optimal index order I*(S). That is, for each candidate unifying method U(S), the unification loss $£_U(x, \Theta(t-1),I*(S),U(S))$ can be computed, where I*(S) can be defined in Equation (8):

$$I*(S)=\mathrm{argmin}_{I(S)}(£_U(x,\Theta(t-1),I(S),U(S))) \quad \text{Eq. (8)}$$

By accumulating the unification loss across different inputs, the unifying method for all inputs can be defined in Equation (9):

$$U*(S)=\mathrm{argmin}_{U(S)}(\Sigma_x £_U(x,\Theta(t-1),I*(S),U(S))) \quad \text{Eq. (9)}$$

When the number of channels c is small, an exhaustive search can be operated to search for the best (or optimal) I*(S) and U*(S) by comparing the unification loss of a set of possible combinations (e.g., all possible combinations) of index order and unifying methods. For a large c, other methods can be used to find suboptimal I*(S) and U*(S). In the present disclosure, no restrictions are applied on ways of determining the optimal I*(S) and U*(S).

Once the order of indexes I*(S) and the feature unifying method U*(S) are determined for every super-block S, a SSU layer (408) can be fixed to unify feature map F of the DNN $\Theta=\{W\}$.

Still referring to FIG. 4, in the second step, the target turns to finding a set of updated optimal DNN weight coefficients $\Theta*=\{W*\}$ by iteratively optimizing the target loss of the original prediction task described in Equation (1).

For learning the DNN weights through network training, an annotation y is given for each corresponding input x, i.e., $\mathcal{D}=\{(x, y, F, \Theta_O)\}$. For the t-th iteration, the current weights $\Theta(t-1)=\{W(t-1)\}$, and $\Theta_O(t-1)=\{W_O(t-1)\}$. The fixed SSU Layer (without learnable weights) of the t-th iteration can thus be added into the whole DNN $\Theta_O(t-1)=\{W_O(t-1)\}$ right after a layer whose output is the feature map, i.e., right after the last layer of DNN $\Theta(t-1)=\{W(t-1)\}$. Through a Network Forward Computation and Feature Unification process (410), each input x can be passed through a new/updated DNN that has the same weight coefficients $\Theta_O(t-1)$ as the original whole DNN but with the added SSU Layer (408), to generate an estimated output $\bar{y}$. Specifically, the Network Forward Computation and Feature Unification process (410) can compute $\bar{y}$ in three steps. In step one, the feature map $F(x,\Theta(t-1))$ can be generated as an output of the DNN part $\Theta(t-1)=\{W(t-1)\}$ based on the input x. Then in step two, a unified feature map $F_U(x,\Theta(t-1))$ can be computed by passing the feature map $F(x, \Theta(t-1))$ through the SSU Layer using a Feature Unification module of the Network Forward Computation and Feature Unification process (410). In the Feature Unification module, all super-blocks {S} of $F(x, \Theta(t-1))$ can be ranked based on the feature unification losses $£_U(U*(S),I*(S))$ of the super-blocks in an ascending order. Then given a unification ratio q(t-1) as a hyperparameter, a top q(t-1) percent of the super-blocks can be unified with the corresponding order indices and unifying methods. At the same time, a feature unifying mask Q(t-1) can be maintained with the same shape as $F(x, \Theta(t-1))$, which records whether a corresponding feature in the feature map generated is unified or not. Next, in step three, the unified feature map Fu (x, $\Theta(t-1)$) can be passed through the remaining part (or layers) of the whole DNN $\Theta_O(t-1)$ to generate the final output $\bar{y}$.

Based on the ground-truth annotation y (or expected y) and the estimated output $\bar{y}$, the target loss $£_T(\mathcal{D}|\Theta_O(t-1))$ in Equation (1) can be defined through a Compute Target Loss process (412). Then a gradient of the target loss can be computed using a Compute Gradient process (414) to obtain a gradient $G(\Theta_O(t-1))$. The automatic gradient computing method used by deep learning frameworks such as tensorflow or pytorch can be used herein to compute the $G(\Theta_O(t-1))$. Based on the gradient $G(\Theta_O(t-1))$, the network coefficients can be updated through Back Propagation using a Back Propagation and Weight Update process (416) to obtain the updated $\Theta_O(t)=\{W_O(t)\}$ (as well as $\Theta(t)=\{W(t)$ as part of the whole DNN}.

The retraining process of the DNN mentioned above can also be an iterative process itself, which can be marked by a dotted box (420) in FIG. 4. Typically, multiple iterations can be taken to update the network weight coefficients, e.g., until the target training loss of Equation (1) converges. The Back Propagation and Weight Update process (416) can choose to accumulate the gradients $G(\Theta_O(t-1))$ of a batch of inputs, and only updates the network coefficients with the accumulated gradients. The batch size can be a pre-defined hyperparameter, and the system iterates over all training data multiple times, where each time can be called an epoch. The system runs multiple epochs until the loss optimization converges. Then the system goes to the next iteration t, where given a new unifying ratio q(t), based on the updated $\Theta_O(t)$ (and $\Theta(t)$), a new set of index order and unifying method can be determined, and an updated SSU Layer can be generated to compute a new unified feature map $F_U(x, \Theta(t))$ for each input x.

The various embodiments described herein can offer several advantages over related examples. The disclosed structured feature unification can improve the efficiency of further encoding of the feature maps, which can significantly reduce the size of the feature map for efficient storage and transmission. Through the iterative retraining process, the learned DNN can be tailored to extract feature maps that are both effective for performing the original prediction and are suitable for later compression. The iterative retraining framework can also provide the flexibility of introducing different loss at different processing steps, e.g., for optimizing unified feature maps or for optimizing the prediction target, making the system focus on different tasks at different times. The disclosed method can be generally applied to datasets with different data forms. The input data x can be a general 4D tensor, which can be a video segment, a color image, or a gray-level image. The disclosed method can be flexibly applied to compress different types of feature maps, such as 2D, 3D and 4D feature maps, with different designs of super-block and block structures. The disclosed framework can be generally applied to different tasks that extract a feature map from a trained backbone network, such as semantic segmentation, image/video classification, object detection, image/video super-resolution, etc.

Figure 5:
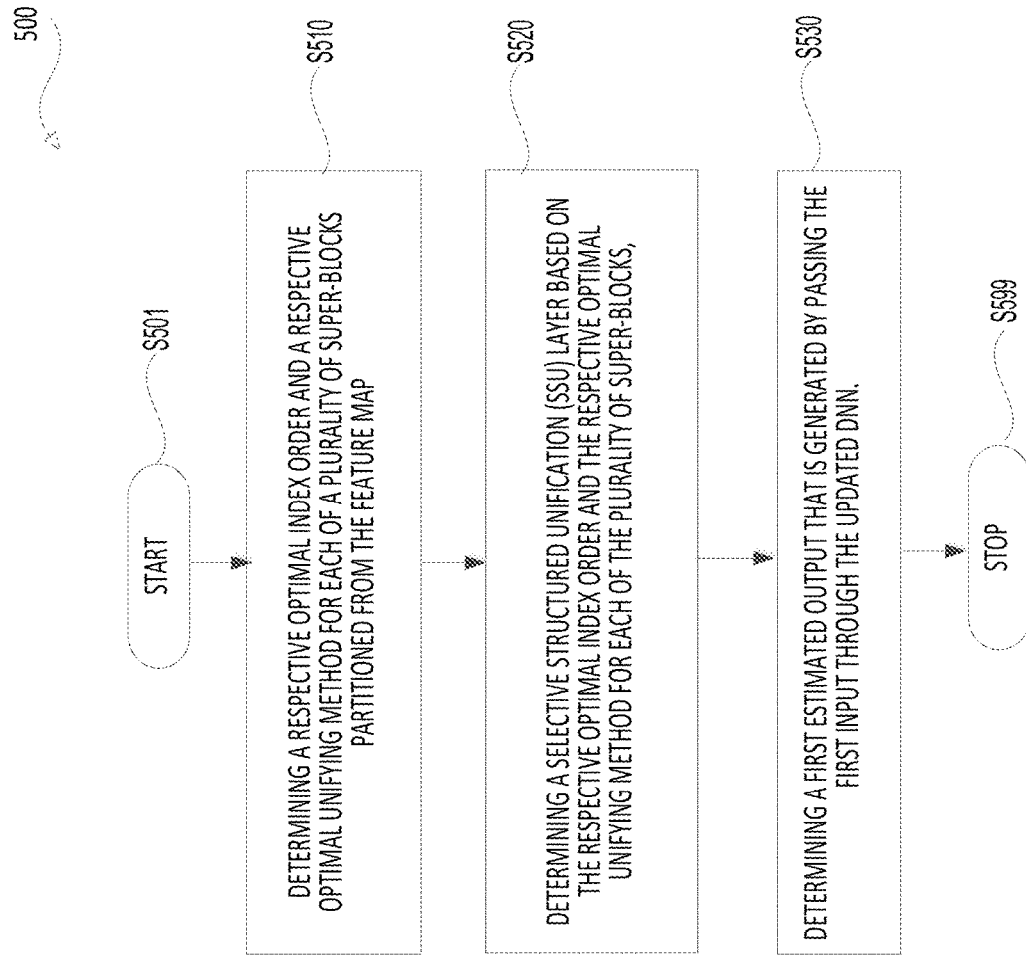
FIG. 5 shows a flow chart outlining a process example according to some embodiments of the disclosure.

FIG. 5 shows a flow chart outlining a process (500) for compressing a feature map generated by passing a first input through a DNN according to an embodiment of the disclosure. The process (500) can start at (S501) and proceed to (S510).

At (S510), a respective optimal index order and a respective optimal unifying method can be determined for each of super-blocks partitioned from the feature map. In order to determine the respective optimal index order and the respective optimal unifying method for each of the super-blocks, unifying methods can be defined for each of the super-blocks. Feature unification losses can be further determined based on the unifying methods for each of the super-blocks. The respective optimal index order and the respective optimal unifying method can then be determined for each of the super-blocks based on the feature unification losses, where the respective optimal index order, and the respective optimal unifying method for the respective super-block can correspond to a minimum feature unification loss of the feature unification losses.

In some embodiments, in order to obtain the feature unification losses, a first feature unification loss of the feature unification losses can be obtained for a first super-block, where the first feature unification loss can be equal to a sum of a compression rate loss, a unification distortion loss, and a computation speed loss.

In some embodiments, in order to obtain the first feature unification loss, the first super-block can be partitioned into blocks, where each of the blocks can have a respective sub compression rate loss, a respective sub unification distortion loss, and a respective sub computation speed loss. The compression rate loss of the first super-block can be determined to be equal to a sum of the sub compression rate losses of the blocks. The unification distortion loss of the first super-block can also be determined to be equal to a sum of the sub unification distortion losses of the blocks. Further, the computation speed loss of the first super-block can be obtained to be equal to a sum of the sub computation speed losses of the blocks.

In some embodiments, each of the sub compression rate losses can be equal to a standard deviation of absolute values of features in a corresponding block. Each of the sub unification distortion losses can be equal to a reciprocal of a multiplication value of a height, a width, and a depth for a corresponding block. Each of the sub computation speed losses can be a function of a number of multiplication operations in a computation using a unifying method for a corresponding block.

At (S520), a selective structured unification (SSU) layer can be determined based on the respective optimal index order and the respective optimal unifying method for each of the super-blocks. The SSU layer can be added to the DNN to form an updated DNN. The SSU layer can be configured to perform unification operations on the feature map. In some embodiments, the SSU layer can be added after an extraction layer of the DNN that generates the feature map.

At (S530), a first estimated output can be determined. The first estimated output that is generated by passing the first input through the updated DNN.

In some embodiments, the process (500) can further include updating network coefficients of the DNN based on a first expected output and the first estimated output. In some embodiments, in order to update the network coefficients of the DNN, the feature map can be generated by passing the first input through the updated DNN, where the feature map is generated by the extraction layer. A unified feature map can be subsequently generated by passing the feature map through the SSU layer that is positioned after the extraction layer. The unified feature map can be further passed through remaining layers of the updated DNN to generate the first estimated output.

In order to generate the unified feature map, the super-blocks of the feature map can be ranked according to feature unification losses of the super-blocks in an ascending order, where each of the super-blocks can be reordered along a depth of the feature map according to a corresponding index order. A unification ratio q can be defined. Further, a q percent of the super-blocks that is ranked in the ascending order can be unified through an index order and a unifying method, where the index order and the unifying method generate a minimum feature unification loss in the feature unification losses of the super-blocks.

In order to update the network coefficients of the DNN based on the first input and the first estimated output, a target loss can be defined according to the first estimated output and the first expected output. A gradient of the target loss can further be obtained. The network coefficients of the DNN can subsequently be updated based on the gradient of the target loss through a back propagation and weight update process.

The techniques described above, can be implemented as computer software using computer-readable instructions and physically stored in one or more computer-readable media.

Figure 6:
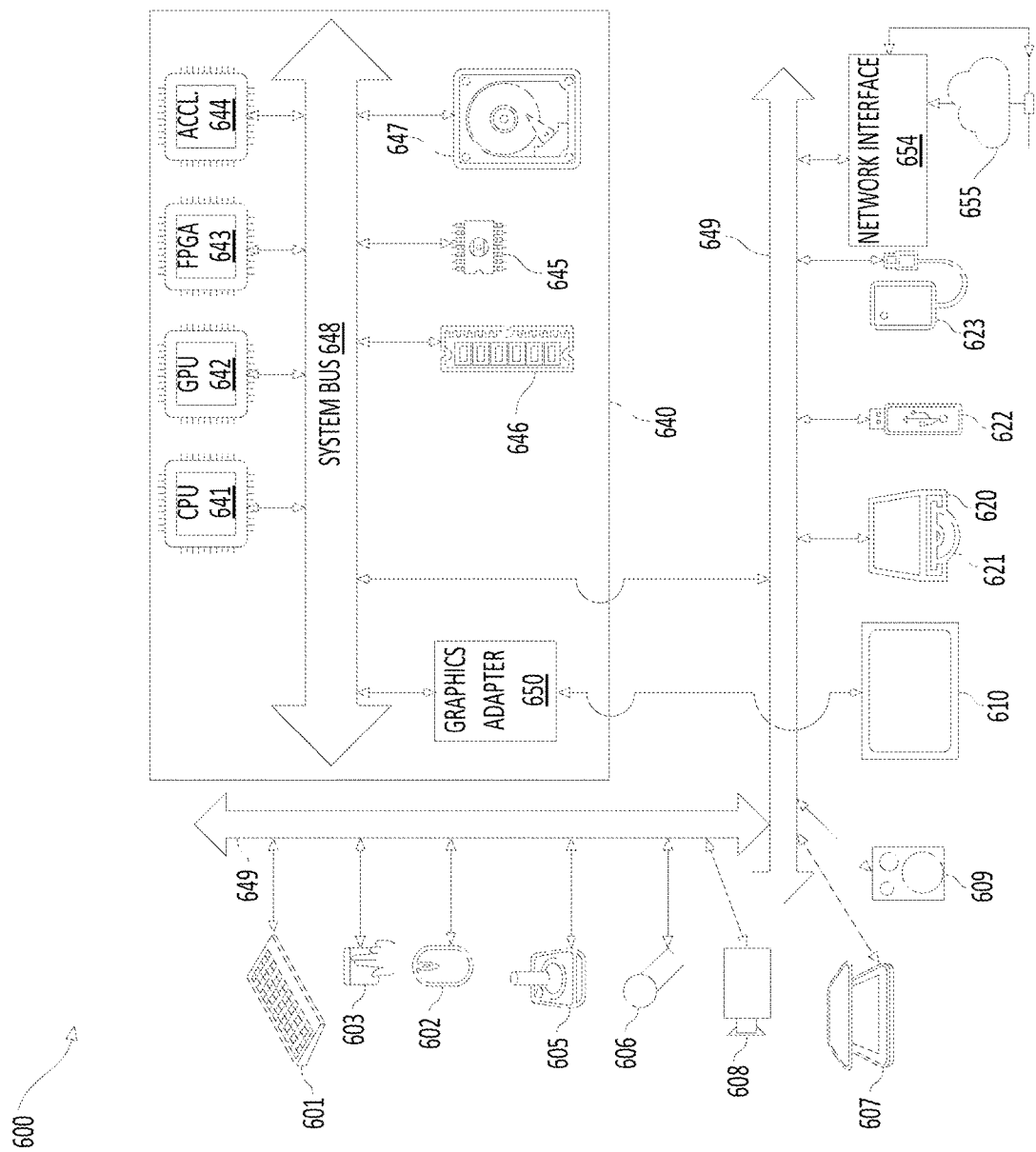
FIG. 6 is a schematic illustration of a computer system in accordance with an embodiment.

For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600), and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of compressing a feature map generated by passing a first input through a deep neural network (DNN), comprising:
   partitioning a first super-block of a plurality of super-blocks into blocks, each of the blocks having a respective sub compression rate loss, a respective sub unification distortion loss, and a respective sub computation speed loss;
   obtaining a compression rate loss of the first super-block, the compression rate loss of the first super-block being a sum of the sub compression rate losses of the blocks, the sub compression rate loss of each of the blocks being based on a standard deviation of absolute values of features in the respective block;
   obtaining a unification distortion loss of the first super-block, the unification distortion loss of the first super-block being a sum of the sub unification distortion losses of the blocks, the sub unification distortion loss of each of the blocks being based on a reciprocal of a multiplication value of a height, a width, and a depth for the respective block;
   obtaining a computation speed loss of the first super-block, the computation speed loss of the first super-block being a sum of the sub computation speed losses of the blocks, the sub computation speed loss of each of the blocks being based on a number of multiplication operations in a computation using a unifying method for the respective block;
   determining a respective optimal index order and a respective optimal unifying method for each of super-blocks partitioned from the feature map based on feature unification losses, the feature unification losses including a first feature unification loss that is equal to a sum of the compression rate loss, the unification distortion loss, and the computation speed loss of the first super-block;
   determining a selective structured unification (SSU) layer based on the respective optimal index order and the respective optimal unifying method for each of the super-blocks, the SSU layer being added after an extraction layer of the DNN that generates the feature map to form an updated DNN, the SSU layer being configured to perform unification operations on the feature map; and
   determining a first estimated output that is generated by passing the first input through the updated DNN.

2. The method of claim 1, further comprising:
   updating network coefficients of the DNN based on a first expected output and the first estimated output.

3. The method of claim 1, wherein the determining the respective optimal index order and the respective optimal unifying method for each of the super-blocks further comprises:
   defining unifying methods for each of the super-blocks;
   obtaining feature unification losses based on the unifying methods for each of the super-blocks; and
   determining the respective optimal index order and the respective optimal unifying method for each of the super-blocks based on the feature unification losses, the respective optimal index order, and the respective optimal unifying method for the respective super-block corresponding to a minimum feature unification loss of the feature unification losses.

4. The method of claim 3, wherein the obtaining the feature unification losses further comprises:
   obtaining the first feature unification loss of the feature unification losses for the first super-block.

5. The method of claim 2, wherein the updating the network coefficients of the DNN further comprises:
   generating the feature map by passing the first input through the updated DNN, the feature map being generated by the extraction layer;
   generating a unified feature map by passing the feature map through the SSU layer that is positioned after the extraction layer; and
   passing the unified feature map through remaining layers of the updated DNN to generate the first estimated output.

6. The method of claim 5, wherein the generating the unified feature map further comprises:
   ranking the super-blocks of the feature map according to feature unification losses of the super-blocks in an ascending order, each of the super-blocks being reordered along a depth of the feature map according to a corresponding index order;
   defining a unification ratio q; and
   unifying a q percent of the super-blocks ranked in the ascending order with an index order and an unifying method that generates a minimum feature unification loss in the feature unification losses of the super-blocks.

7. The method of claim 6, wherein the updating the network coefficients of the DNN based on the first input and the first estimated output further comprises:
defining a target loss according to the first estimated output and the first expected output;
obtaining a gradient of the target loss; and
updating the network coefficients of the DNN based on the gradient of the target loss through a back propagation and weight update process.

8. The method of claim 7, further comprising:
determining a second estimated output that is generated by passing a second input through the updated DNN; and
updating the network coefficients of the DNN based on a second expected output and the second estimated output.

9. An apparatus, comprising:
processing circuitry configured to:
partition a first super-block of a plurality of super-blocks into blocks, each of the blocks having a respective sub compression rate loss, a respective sub unification distortion loss, and a respective sub computation speed loss;
obtain a compression rate loss of the first super-block, the compression rate loss of the first super-block being a sum of the sub compression rate losses of the blocks, the sub compression rate loss of each of the blocks being based on a standard deviation of absolute values of features in the respective block:
obtain a unification distortion loss of the first super-block, the unification distortion loss of the first super-block being a sum of the sub unification distortion losses of the blocks, the sub unification distortion loss of each of the blocks being based on a reciprocal of a multiplication value of a height, a width, and a depth for the respective block;
obtain a computation speed loss of the first super-block, the computation speed loss of the first super-block being a sum of the sub computation speed losses of the blocks, the sub computation speed loss of each of the blocks being based on a number of multiplication operations in a computation using a unifying method for the respective block;
determine a respective optimal index order and a respective optimal unifying method for each of super-blocks partitioned from a feature map based on feature unification losses, the feature map being generated by passing a first input through a deep neural network (DNN), the feature unification losses including a first feature unification loss that is equal to a sum of the compression rate loss, the unification distortion loss, and the computation speed loss of the first super-block;
determine a selective structured unification (SSU) layer based on the respective optimal index order and the respective optimal unifying method for each of the super-blocks, the SSU layer being added after an extraction layer of the DNN that generates the feature map to form an updated DNN, the SSU layer being configured to perform unification operations on the feature map; and
determine a first estimated output that is generated by passing the first input through the updated DNN.

10. The apparatus of claim 9, wherein the processing circuitry is further configured to:
update network coefficients of the DNN based on a first expected output and the first estimated output.

11. The apparatus of claim 9, wherein the processing circuitry is further configured to:
define unifying methods for each of the super-blocks;
obtain feature unification losses based on the unifying methods for each of the super-blocks; and
determine the respective optimal index order and the respective optimal unifying method for each of the super-blocks based on the feature unification losses, the respective optimal index order, and the respective optimal unifying method for the respective super-block corresponding to a minimum feature unification loss of the feature unification losses.

12. The apparatus of claim 11, wherein the processing circuitry is further configured to:
obtain the first feature unification loss of the feature unification losses for the first super-block.

13. The apparatus of claim 10, wherein the processing circuitry is further configured to:
generate the feature map by passing the first input through the updated DNN, the feature map being generated by the extraction layer;
generate a unified feature map by passing the feature map through the SSU layer that is positioned after the extraction layer;
pass the unified feature map through remaining layers of the updated DNN to generate the first estimated output;
define a target loss according to the first estimated output and the first expected output;
obtain a gradient of the target loss; and
update the network coefficients of the DNN based on the gradient of the target loss through a back propagation and weight update process.

14. A non-transitory computer-readable medium storing instructions which when executed by a computer cause the computer to perform:
partitioning a first super-block of a plurality of super-blocks into blocks, each of the blocks having a respective sub compression rate loss, a respective sub unification distortion loss, and a respective sub computation speed loss;
obtaining a compression rate loss of the first super-block, the compression rate loss of the first super-block being a sum of the sub compression rate losses of the blocks, the sub compression rate loss of each of the blocks being based on a standard deviation of absolute values of features in the respective block;
obtaining a unification distortion loss of the first super-block, the unification distortion loss of the first super-block being a sum of the sub unification distortion losses of the blocks, the sub unification distortion loss of each of the blocks being based on a reciprocal of a multiplication value of a height, a width, and a depth for the respective block;
obtaining a computation speed loss of the first super-block, the computation speed loss of the first super-block being a sum of the sub computation speed losses of the blocks, the sub computation speed loss of each of the blocks being based on a number of multiplication operations in a computation using a unifying method for the respective block;
determining a respective optimal index order and a respective optimal unifying method for each of super-blocks partitioned from a feature map based on feature unification losses, the feature map being generated by passing a first input through a deep neural network (DNN), the feature unification losses including a first feature unification loss that is equal to a sum of the compression rate loss, the unification distortion loss, and the computation speed loss of the first super-block;

determining a selective structured unification (SSU) layer based on the respective optimal index order and the respective optimal unifying method for each of the super-blocks, the SSU layer being added after an extraction layer of the DNN that generates the feature may to form an updated DNN, the SSU layer being configured to perform unification operations on the feature map; and determining a first estimated output that is generated by passing the first input through the updated DNN.

* * * * *